(12) United States Patent  (10) Patent No.: US 8,576,184 B2
Arrasvuori et al.  (45) Date of Patent: Nov. 5, 2013

(54) METHOD AND APPARATUS FOR BROWSING CONTENT FILES

(75) Inventors: Juha Henrik Arrasvuori, Tampere (FI); Elina Maria Inkeri Ollila, Helsinki (FI); Mika Antero Rautava, Espoo (FI); Olli Esa Immonen, Helsinki (FI); Guido Peter Grassel, Espoo (FI); Ari Antero Aarnio, Espoo (FI)

(73) Assignee: Nokia Corporation, Espoo (FI)

( * ) Notice: Subject to any disclaimer, the term of this patent is extended or adjusted under 35 U.S.C. 154(b) by 357 days.

(21) Appl. No.: 12/859,303

(22) Filed: Aug. 19, 2010

(65) Prior Publication Data

US 2012/0044153 A1  Feb. 23, 2012

(51) Int. Cl.
*G06F 3/041*  (2006.01)
*G06F 3/00*  (2006.01)

(52) U.S. Cl.
USPC ............................ 345/173; 715/700; 382/181

(58) Field of Classification Search
USPC ............................ 345/173–178; 715/700–866
See application file for complete search history.

(56) References Cited

U.S. PATENT DOCUMENTS

| 7,765,184 | B2 | 7/2010 | Makela |
| 7,865,927 | B2 | 1/2011 | Brodersen et al. |
| 2007/0300158 | A1 | 12/2007 | Kasperkiewicz et al. |
| 2008/0066099 | A1* | 3/2008 | Brodersen et al. ............... 725/35 |
| 2008/0163379 | A1* | 7/2008 | Robinson et al. ............... 726/27 |
| 2008/0281805 | A1* | 11/2008 | Xiaolu et al. ...................... 707/5 |
| 2009/0327939 | A1 | 12/2009 | Johns et al. |
| 2010/0166339 | A1* | 7/2010 | Gokturk et al. ............... 382/305 |
| 2010/0217769 | A1 | 8/2010 | Matsui |
| 2010/0235740 | A1 | 9/2010 | Friedlander et al. |
| 2010/0260426 | A1* | 10/2010 | Huang et al. ................... 382/218 |
| 2011/0077355 | A1 | 3/2011 | Shikisai et al. |

FOREIGN PATENT DOCUMENTS

| JP | 2010-218247 A | 9/2010 |
| WO | WO 2010/042703 A2 | 4/2000 |
| WO | WO 2010/131238 A1 | 11/2010 |

OTHER PUBLICATIONS

International Search Report for related International Patent Application No. PCT/FI2011/050687 dated Jan. 24, 2012, pp. 1-9.
International Written Opinion for related International Patent Application No. PCT/FI2011/050687 dated Jan. 24, 2012, pp. 1-8.

* cited by examiner

*Primary Examiner* — Ariel Balaoing
*Assistant Examiner* — Christopher Kohlman
(74) *Attorney, Agent, or Firm* — Ditthavong, Mori & Steiner, P.C.

(57) ABSTRACT

An approach is presented for browsing content files. The data manager determines to present a file at a device. Further, the data manager receives an input for selecting one or more of elements of metadata associated with the file based, at least in part, on the presentation of the file. Then, the data manager determines to select one or more other files based, at least in part, on the input.

19 Claims, 17 Drawing Sheets

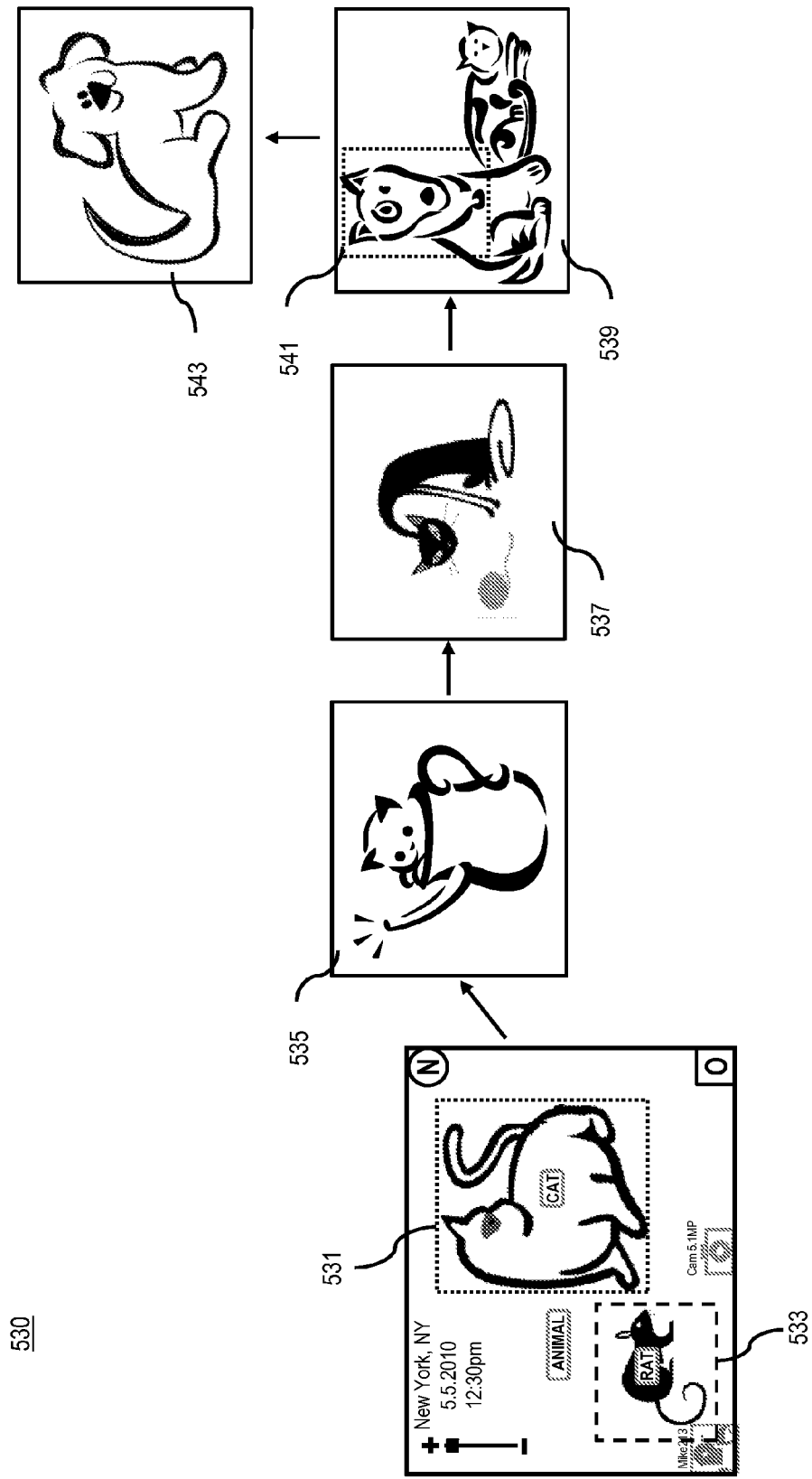

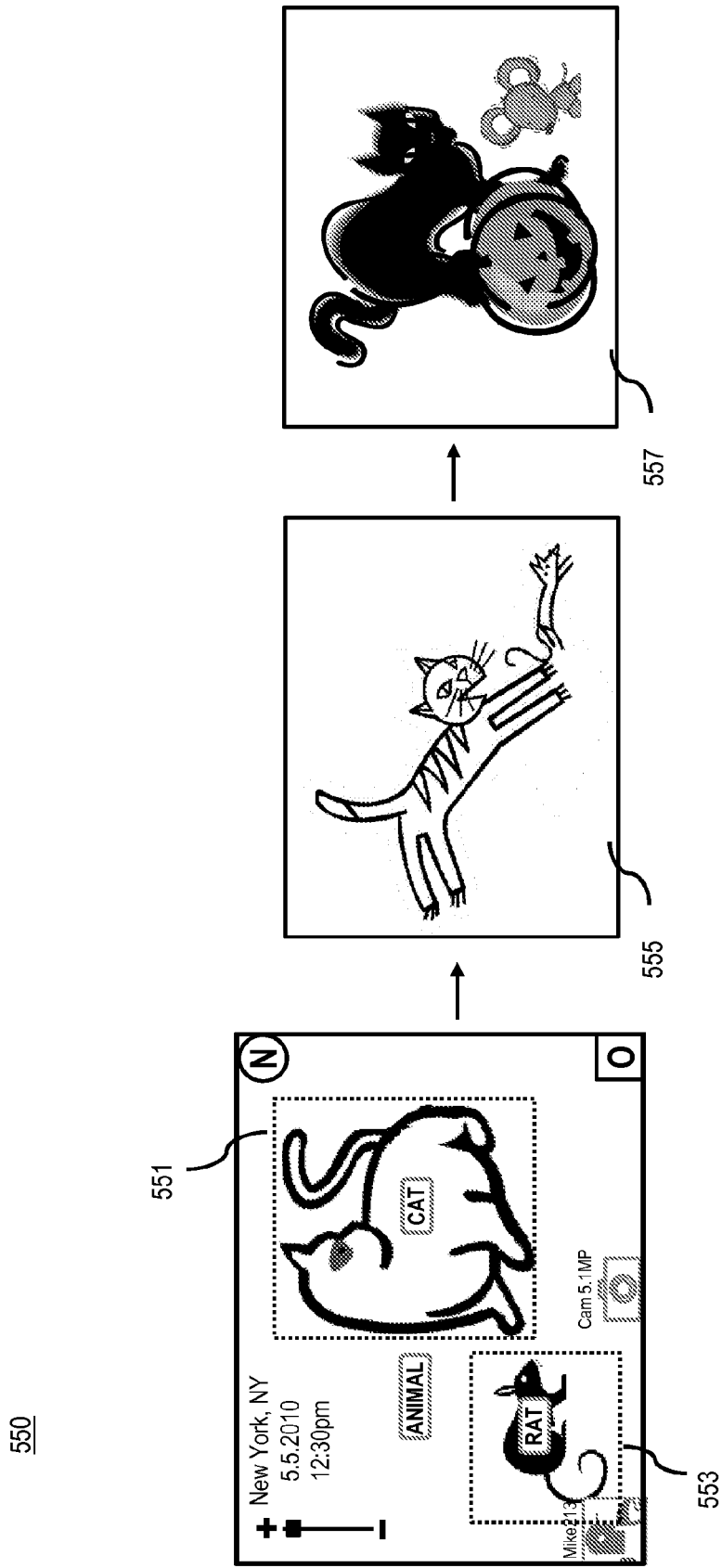

METHOD AND APPARATUS FOR BROWSING CONTENT FILES

BACKGROUND

Service providers and device manufacturers (e.g., wireless, cellular, etc.) are continually challenged to deliver value and convenience to consumers by, for example, providing compelling network services. Many of these services (e.g., image-sharing services, social networking services, etc.) involve the generation, retrieval, and/or access of potentially large volumes of content files (e.g., images, videos, etc.). Accordingly, service providers and device manufacturers can face significant technical challenges to enabling a user to efficiently sift through the content files and discover files that are interesting or otherwise relevant. Traditionally, users can use conventional search techniques (e.g., search engines) to locate files of interest, but may quickly become jaded or bored with such conventional approaches. As a result, service providers and device manufacturers face additional technical challenges to improving user experience by implementing innovative approaches for accessing content.

Some Example Embodiments

Therefore, there is a need for an approach for efficiently browsing and/or selecting files (e.g., content files such as images, videos, etc.) for access.

According to one embodiment, a method comprises determining to present a file at a device. The method also comprises receiving an input for selecting one or more of elements of metadata associated with the file based, at least in part, on the presentation of the file. Further, the method also comprises determining to select one or more other files based, at least in part, on the input.

According to another embodiment, an apparatus comprises at least one processor, and at least one memory including computer program code, the at least one memory and the computer program code configured to, with the at least one processor, cause, at least in part, the apparatus to determine to present a file at a device. The apparatus is further caused to receive an input for selecting one or more of elements of metadata associated with the file based, at least in part, on the presentation of the file. Further, the apparatus is also caused to determine to select one or more other files based, at least in part, on the input.

According to another embodiment, a computer-readable storage medium carries one or more sequences of one or more instructions which, when executed by one or more processors, cause, at least in part, an apparatus to determine to present a file at a device. The apparatus is further caused to receive an input for selecting one or more of elements of metadata associated with the file based, at least in part, on the presentation of the file. Further, the apparatus is also caused to determine to select one or more other files based, at least in part, on the input.

According to another embodiment, an apparatus comprises means for determining to present a file at a device. The apparatus further comprises means for receiving an input for selecting one or more of elements of metadata associated with the file based, at least in part, on the presentation of the file. Further, the apparatus also comprises means for determining to select one or more other files based, at least in part, on the input.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D are diagrams of user interfaces utilized in the processes of FIG. 3, when selecting the files, according to various embodiments;

DESCRIPTION OF SOME EMBODIMENTS

Examples of a method, apparatus, and computer program for browsing content files are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
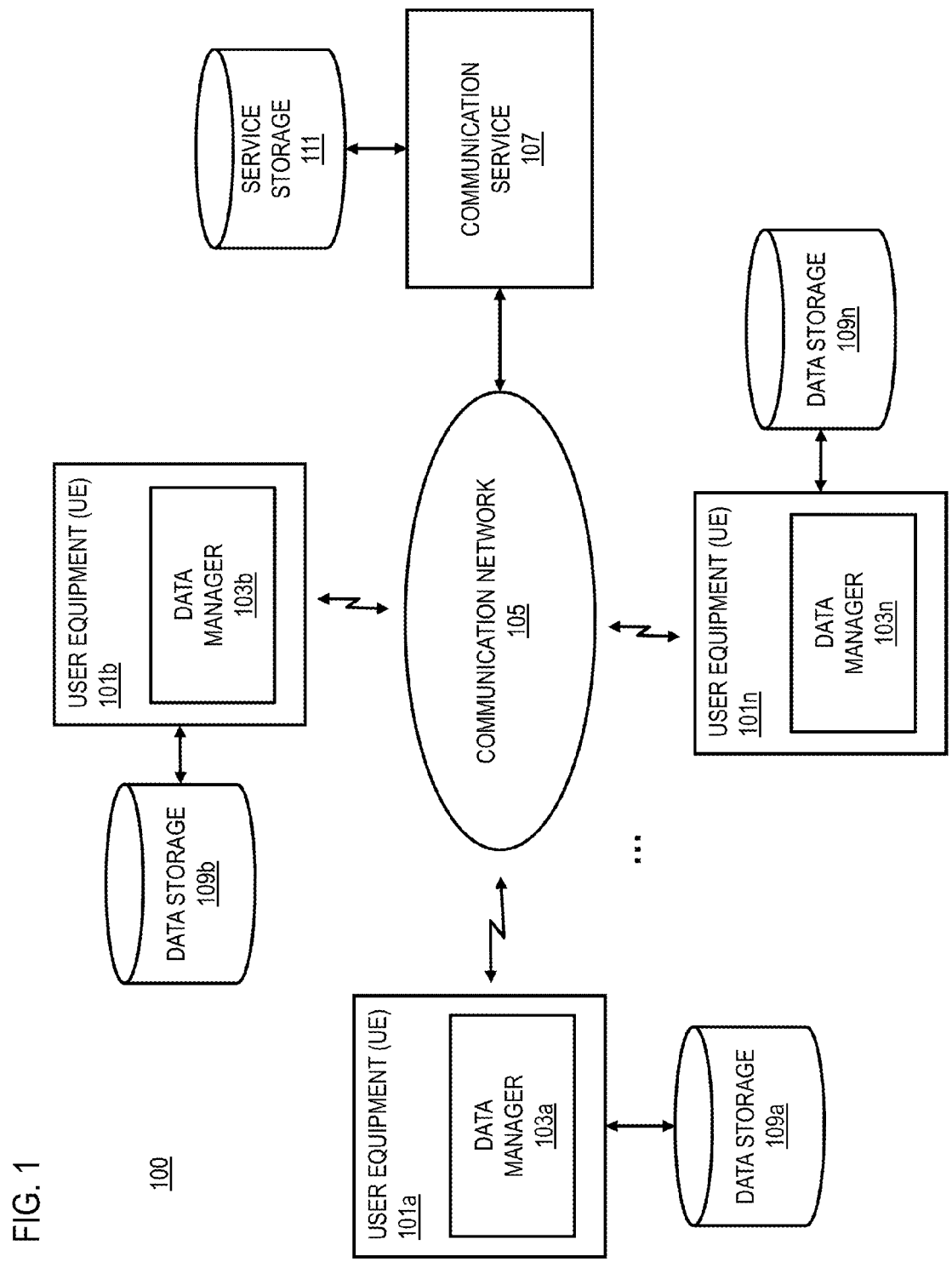
FIG. 1 is a diagram of a system capable of browsing content files, according to one embodiment.

FIG. 1 is a diagram of a system capable of browsing content files, according to one embodiment. Methods to locate and obtain data (e.g., content files, documents, etc.) that satisfy the user's selection criteria have been developed over the years. These methods have been improving with development of new data technologies (e.g., data structures such as metadata) as well as new hardware features (e.g., touch screens) enabling user-friendly ways to define selection criteria. However, the methods to locate, select and obtain data are still often based on traditional approaches (e.g., manual searches using keywords or terms). The methods based on the traditional approaches may be a time-consuming way to search or browse through a collection of data, especially if the collection of the data is large. Further, because the traditional approaches are based on the user manually entering keywords or criteria for search and browse related data, this may not always provide the most user-friendly way to browse the data. Therefore, new methods to select data based on criteria need to be further exploited to enhance user experience in browsing data.

To address this problem, a system 100 of FIG. 1 introduces the capability to analyze elements of metadata associated with a file, in order to select more files that match the metadata. More specifically, the system 100 presents a file at the UE 101 and determines metadata associated with the file rendered at the UE 101. The file may be any type of data (e.g., image, video, document, website) that may be presented at the UE 101. In one embodiment, the file may be presented by rendering or visual presentation of the information in the file on a display device. Thus, for example, presentation of a file such as an image file may include displaying the image file on a screen (or any other type of display device) at the UE 101, via an image viewing application. The UE 101 may include a data manager 103 to manage the files or any other data, and present them at the UE 101. The file presented at the UE 101 may be retrieved from a communication service 107 or a service storage 111 connected to the communication service 107. The files presented at the UE 101 may also be a file already existing in the UE 101 or may be retrieved from a data storage 109 connected to the UE 101.

Then, the system 100 receives an input at the UE 101 for selecting elements of metadata associated with the file presented at the UE 101, based on the presentation of the file, and selects other files based on the input. The metadata associated with the file being presented may contain elements. As used herein, an element of the metadata may be a term or a field in the metadata that contains specific information about the file, such as technical properties of the file as well as information about the content of the file. In one embodiment, these elements may be displayed in a list such that the elements may be selected via the input. In another embodiment, the input may select areas of the file, and wherein the areas are associated with the elements. In this case, these elements of the metadata may be associated with distinct areas in the presented file. By way of example, if the file is an image file of a cat, the system 100 may receive an input as a user tapping on the area of the image that has a cat, and the element associated with this area may indicate a keyword "cat." Then, based on this keyword in the element, the other files that have a similar keyword may be selected.

In one embodiment, the system 100 identifies figures and/or objects in the selected areas, and then selects the files based further on the identification. For example, if the element is descriptive of an object in the file, the system 100 can identify the object in the file (e.g., using identification or recognition algorithms commonly known in the art) and then delineate an area corresponding to the object in the file. In this example, the system 100 may identify the object "cat" in the selected area of the image file, if the selected area contains the image object "cat", and select the other image files further based on the identified object "cat."

In another embodiment, the input for selecting the areas of the file also selects from the set of the elements, and selecting of the other files is further based on the selected set of elements. In one example, the elements may be presented at the UE 101 such that the elements may be selected. For an image file containing a cat, the element with a keyword "cat" may be displayed as a text "cat" at the UE 101, and upon selection of this element, the system 100 selects the other files based on this selected element "cat," thus selecting image files containing a cat.

The metadata may include elements with technical properties obtained from the device that was used to create the file. The technical properties may include information regarding a creator of the file, time of creation, location, heading, zoom setting, image/audio/video setting or any other settings. The metadata may also include information regarding the purpose of the file as well as the details of contents or background or types included in the file. For example, if the file is a picture image of a cat and a mouse sharing a bowl, the contents included in the file include a cat, a mouse, and a bowl, and thus the metadata may contain the keywords "cat," "mouse," and "bowl." Further, the file and/or the other files may include images, videos, web pages, documents, etc. or any combination thereof.

The system 100 may select the other files from one or more of the data storages 109a-109n and/or from the communication service 107 as well as the service storage 111. The system 100 may enable a user to define the preferred sources to select these other files. Then, these other files may be organized in the order of preferences of the sources. These files may be organized in manner to have a compilation of the files in a slide show format. For example, if the selected element has a keyword "cat," and thus the selected other image files also have the keyword "cat," then the selected other image files can consist a slide show of a cat. Further, based on the user input or settings, one slide show may be presented or multiple slide shows may be presented at the same time by arranging the slide shows in parallel.

In one embodiment, the elements of the metadata may be displayed at the UE 101 as elements, and these elements may be selected such that the other files may be selected based on the selected elements. In another embodiment, the elements of the metadata may be presented as representations of the elements at the UE 101. The representations may be presented as superimposed on the presented file, based on the association between the elements and the areas of the presented file. The representations may include a text label, icon, a box, graphics, a boundary, etc. and represent the information in the corresponding elements. For example, if the file is an image of a cat, a graphical icon of a cat's face may be displayed at the UE 101, for an element that has a keyword "cat" on the area associated with the element. This cat graphical icon may be superimposed on the area of the presented file that has a picture of a cat, if that area is associated with the element having the keyword "cat." If the input is by touch, these representations may also be presented based on touch inputs, gestures, or combination thereof with respect to the presented file. For example, a user may tap an area of the presented file that was displayed on a touch screen of the UE 101, and such tapping may show the element of the metadata corresponding to the area that is tapped by the user. In another embodiment, if the input is by touch, the system 100 may determine touch pressure information for the respective selected areas, and present other files based on the respective touch pressure information. If there are elements that are not associated with any areas of the presented file, then representations of these elements may not be displayed or may be displayed at predetermined areas in the presented file.

In another embodiment, the input also includes a sequence of the selected elements of the metadata in the presented file. For example, a user may select #1 as an input for one element and select #2 as another element, to place these elements in a sequence. Then, the system 100 presents the other files based on the sequence. For example, the other files that are related to the selected element that is defined by the input as first in sequence (e.g., #1 mark) may be presented before the other files that are related to another selected element that is defined by the input as second in sequence (e.g., #2 mark). Further, in another embodiment, the system 100 may determine degrees of matching of the other files to the elements, and present the other files based on the respective degrees of matching. For example, the other files that match well with the selected elements (e.g., thus having more similar properties) may be presented before the other files that do not match well.

Therefore, the advantage of this approach is that the UE 101 provides a novel way to select and obtain files based on the metadata elements of the files and selection of such metadata elements of metadata associated with the file. This approach provides a novel browsing experience for a user who wants to find other files based on the information within the file presented at the UE 101. Further, this approach may be applied to any files that may be presented (e.g., rendered) visually at the UE 101 and contains metadata, and thus provides flexibility in application of this approach. Accordingly, means for browsing content files is anticipated.

As shown in FIG. 1, the system 100 comprises a user equipment (UE) 101 having connectivity to the communication service 107 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101a-101n and the communication service 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
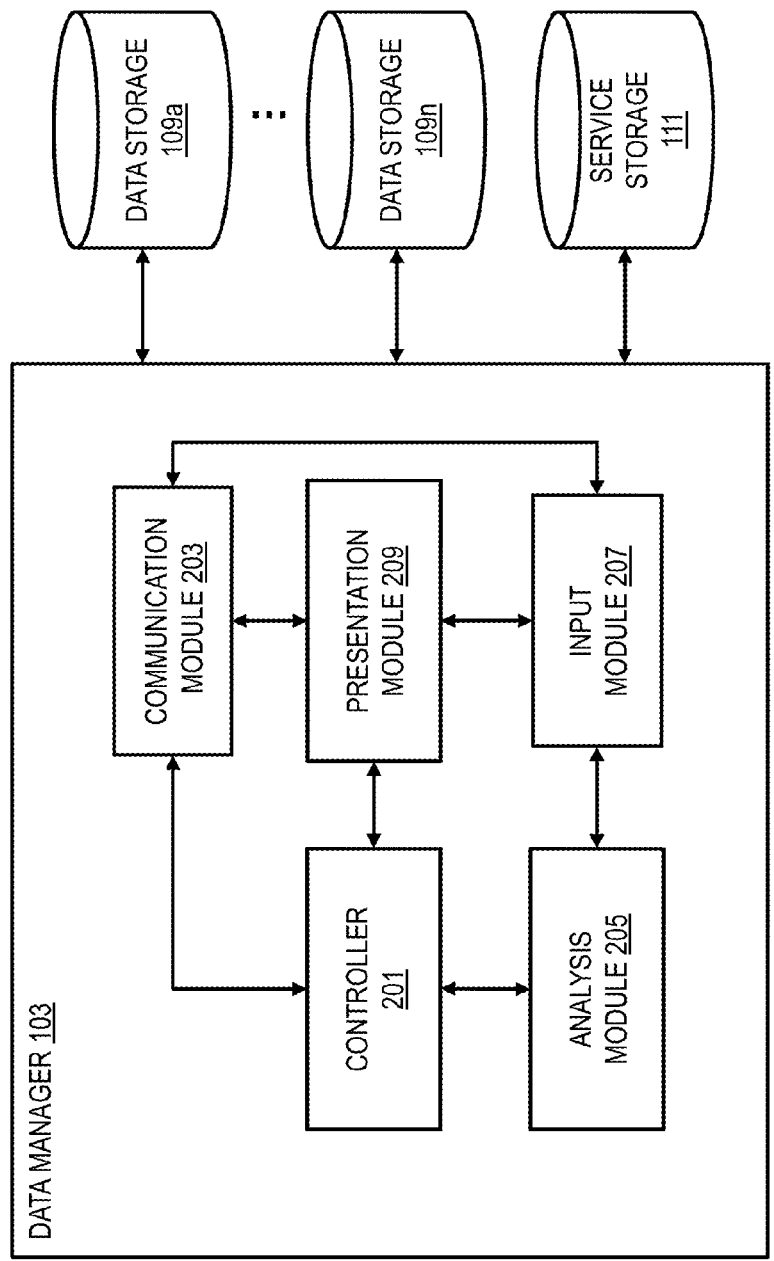
FIG. 2 is a diagram of the components of the data manager, according to one embodiment.

FIG. 2 is a diagram of the components of the data manager 103, according to one embodiment. By way of example, the data manager 103 includes one or more components for browsing content files. It is contemplated that the functions of these components may be combined in one or more components or performed by other components of equivalent functionality. In this embodiment, the data manager 103 includes a controller 201, a communication module 203, an analysis module 205, an input module 207, and a presentation module 209. The controller 201 oversees tasks, including tasks performed by the communication module 203, the analysis module 205, the input module 207 and the presentation module 209. The communication module 203 manages and controls any incoming and outgoing communications such as transfer of the files to be presented at the UE 101 and the other files selected by the UE 101. The communication module 203 may also manage and control receiving various requests from other UEs 101 or the communication service 107 as well as telephone calls, text messaging, instant messaging and Internet communications.

The UE 101 may also be connected to storage media such as the data storage media 109a-109n such that the data manager can retrieve or store files. By way of example, if the data storage media 109a-109n are not local, then the UE 101 may access them via the communication network 105. The UE 101 may also be connected to the service storage 111 via the communication network 105 such that the data manager 103 may be able to manage or access media data or any other related data in the service storage medium 111. The analysis module 205 performs various analysis based on the metadata, the presented file, available sources for the files, and etc., so as to select other files based on the information about the file being rendered at the UE 101. The input module 207 manages various type of input entered into the UE 101. For example, the input module 207 manages receiving an input for selecting elements of metadata associated with the file, to select other files based on the input. The presentation module 209 controls display of a user interface such as a graphical user interface, to convey information and to allow user to interact with the UE 101 via the interface. The presentation module 209 interacts with the controller 201, the communication module 203 and the analysis module 205 to display any information generated during their operation (e.g., displaying the files, presenting other selected files, elements of metadata, and any other information).

In one embodiment, the presentation module 209 first presents a rendering of a file at the UE 101. The file may be any type of file including a content that can be rendered (e.g., displayed via a display screen) at the UE 101. The file may be stored locally in the data storage 109 or may be obtained from an external source, such as another device or the communication service 107, via the communication module 203. The presentation module 209 may also present other options such as a hierarchy option to select different hierarchies of the elements of the metadata as well as a zooming option to zoom in and out the rendering of the file. The analysis module 205 reads metadata associated with the file. The metadata may be contained within the file and/or may be acquired separately from another source, such as the communication service 107. The metadata has elements that are specific portions of the metadata that represent particular type of information, and thus each element may have different information about the file. For example, respective elements may contain information regarding the file, including technical properties (e.g., date, time and location of creation of the file, creator of the file, settings for the file, etc.) as well as properties of contents of the file (e.g., type of the content, names of people, etc.). The analysis module 205 also determines association between elements of the metadata and areas of the rendering of the file, as particular areas of the rendering may correspond to specific elements of the metadata. Thus, in one embodiment, by selecting an area, the element associated with the selected area is also selected. For example, an area of an image file having a cat may be associated with the element having a keyword "cat," such that selecting this area would result in selection of the keyword "cat."

The input module 207 receives an input for selecting elements of metadata associated with the file, based on the presentation of the file. The input may be received by pressing a button or an icon displayed in an area of the presented file. The input may also be received by a touch or a tapping of a touch screen such that the touch or the tapping corresponds to the area to be selected. The analysis module 205 then selects other files based on the input. Thus, the analysis module 205 may select other files that are related to the file presented at the UE 101, according to the elements selected via the input. In one example, the analysis module 205 may select the other files according to the elements associated with the areas, wherein the input selects the area of the presented file. Further, the settings may be configured such that the analysis module 205 may also select other files that are not related to the file. Further, if there are multiple elements on which the selection is based, then the settings may be configured such that the selection is based on any combination of the elements. The selection based on the combination of the elements may include selecting files that include at least one of the elements, all of the elements, none of the elements or any logical combination of the elements, for example. These other files may consist of a compilation or a slide show of the files that the user wants to view, based on the selected elements.

In one embodiment, the presentation module 209 presents elements with the file, such that the elements may be selected by an input. The input for selecting the areas of the file may also select the elements presented at the UE 101, and then the analysis module 205 selects the other files further based on the selected elements. In one example, the presentation module 209 may display a list of elements that can be selected. In another example, the presentation module 209 may present the representations of the elements superimposed on the presented file based on the association between the elements of the metadata and the areas of the rendering. Thus, each representation may be superimposed in a distinct area of the rendering, and the user may choose the representation to choose what element is used to select other files related to the rendered file. The representation may be a graphical icon, a text, or a combination thereof, and may represent a type or a content of the element that the representation is associated with. The user may define what elements are presented as representations superimposed on the rendering. For example, the user may choose to display representations for the creator and the time of the file on the rendering, but hide representations for other elements. For an input that is entered by touch, the input module 207 may receive an input as touch inputs, gestures, or combination thereof with respect to the presented file. For example, the representations may be invisible, but may become visible on the rendering with an triggering action, such as touching, gestures, tapping on the rendering, as well as selecting via pressing a button. The presentation module 209 may automatically select the representations to be displayed, especially if there are too many representations to be displayed on the presented file. By way of example, the analysis module 205 may organize the elements in a hierarchy such that only representations of the elements in high hierarchy are displayed on the rendering while the subsets of such elements are not displayed. The subsets may be displayed after a user selects the representation of the element to which the subsets belong.

In another embodiment, the input module 207 and/or the analysis module 205 identifies figures and/or objects in the selected areas of the presented file. Then, the selection of the other files is further based on this identification of the figures and/or the objects. For example, for elements descriptive of the figures/objects in the file, the figures and/or objects in the selected area may be identified based on this description. For example, if the selected area in the file has an image of a cat and an element of the metadata is related to the keyword "cat," then the analysis module 205 identifies the object as a cat, and the other files may be selected further based on the keyword "cat.".

Further, for an input that is by touch, the input module 207 determines touch pressure information for the selected areas in the presented file, and determines to present other files based on the touch pressure information. For example, a duration of a touch pressure on an area associated with an element may determine how many files related to the element are to be selected, wherein a longer duration would result in more files to be selected. As another example, when multiple touch pressures are applied in the multiple elements in multiple areas, selection of the multiple elements may be applied in determining the files to be selected. Additionally, the analysis module 205 may also be capable of automatically finding the most suitable selection of files related to the file being presented (e.g., via collaborative filtering or a learning system that learns the user's preferences based on statistics in selection and other user behaviours and available information).

The input module 207 may also receive an input that includes a sequence of the selected elements. Then, the analysis module 205 determines to present other files based on the sequence. For example, if the first selected element is set as first and the second selected element is set as second in sequence, the files selected based on the first selected element are presented first and then the files selected based on the second selected element are presented. In addition, the input module 207 may receive preference information for sources that may contain files to be selected. Then, the analysis module 205 selects the other files based on the preference information. For example, if the preference information indicates that the service storage 111 is more preferred as a source than the data storage 109, then the other files are selected from the service storage 111 first and then are selected from the data storage 109. In this example, if ten other files are selected from the sources, and each of the data storage 109 and the service storage 111 has eight files, then eight files may be selected from the service storage 111 first and then two files may be selected from the data storage 109. In addition, the analysis module 205 may determine degrees of matching of the other files to the elements, and determine to present the other files based on the respective degree of matching.

Figure 3:
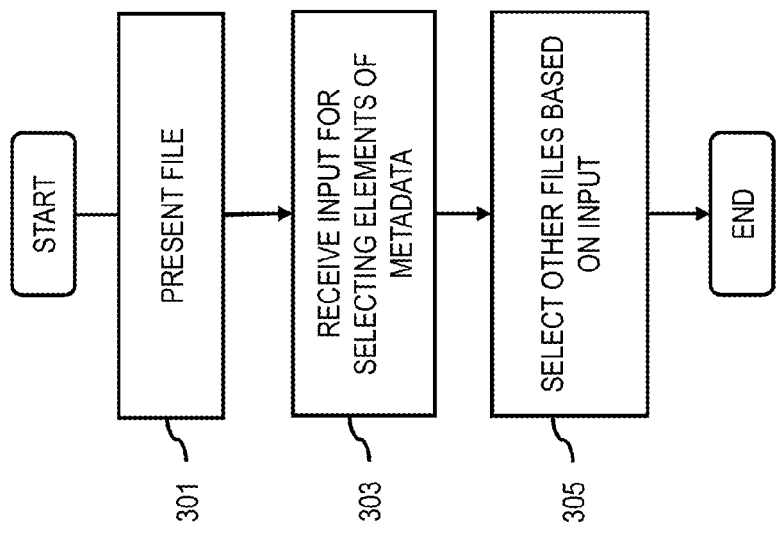
FIG. 3 is a flowchart of a process for browsing content files, according to one embodiment.
Figure 7:
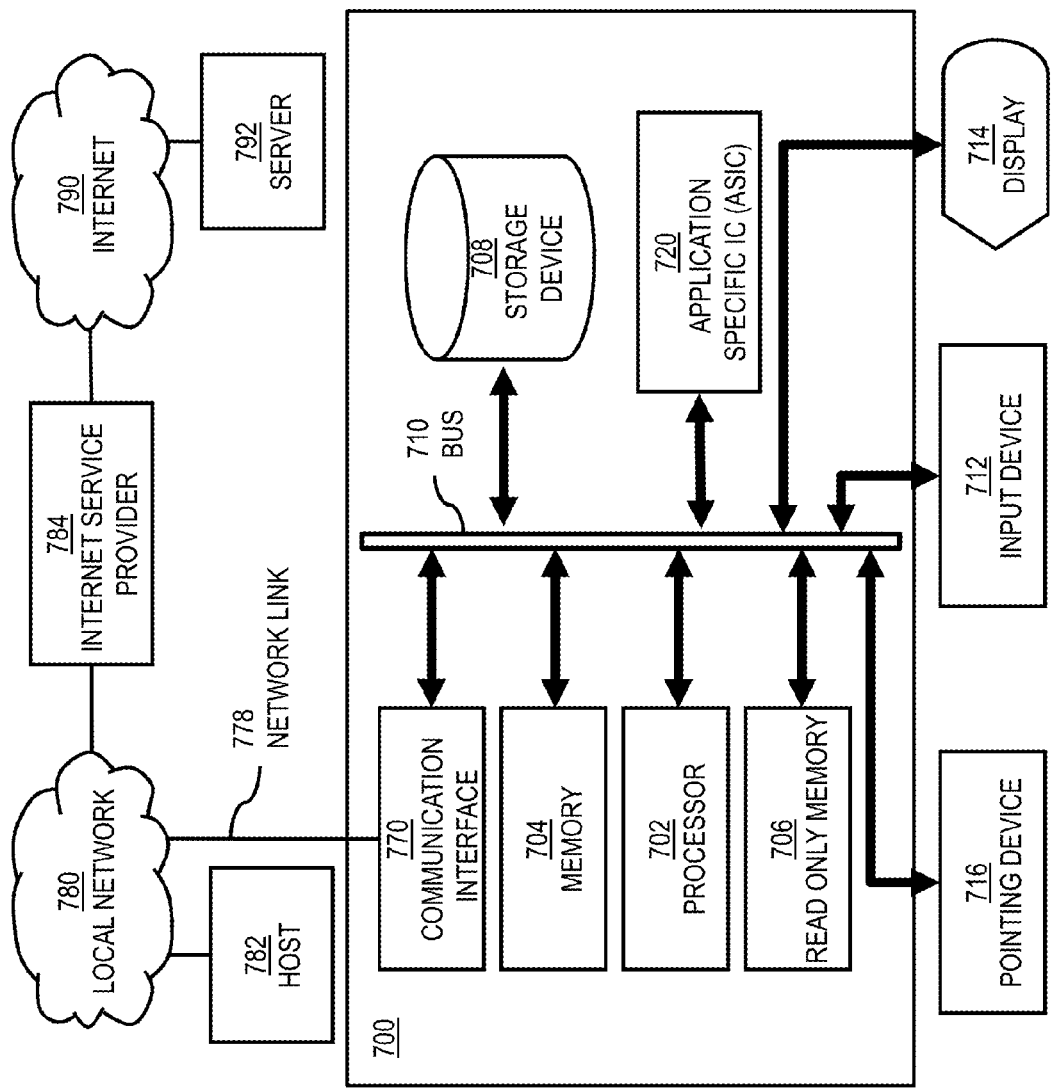
FIG. 7 is a diagram of hardware that can be used to implement an embodiment of the invention.

FIG. 3 is a flowchart of a process for browsing content files, according to one embodiment. In one embodiment, the data manager 103 performs the process 300 and is implemented in, for instance, a chip set including a processor and a memory as shown in FIG. 7. In step 301, the data manager 103 presents a file at the UE 101. The file may be presented as a graphical presentation being rendered on a screen. For example, an image file may be rendered by being displayed on a screen of the UE 101 via a software application that can read the image. The file may be any type of file that can be presented at the UE 101, such as an image, a video, a document, web page and etc. This file may be a file being accessed locally at the UE 101 or remotely at another device such as the communication service 107.

In step 303, the data manager 103 receives an input for selecting one or more of the elements of metadata associated with the file based, at least in part, on the presentation of the file, and then in step 305, the data manager 103 selects other files based, at least in part, on the input. In one example, the elements may be displayed at the UE 101 as a list, and may be selected by selecting the elements on the list. Further, the input may select one or more areas of the file, and wherein the one or more areas are associated with the one or more elements. Thus, in another example, the presented file may have areas that are associated with the respective elements of the metadata. Thus, these areas of the presented file may be associated with the respective elements, and selecting certain area of the rendering may be interpreted as selecting an element of the metadata that corresponds to the selected area. Further, to select and retrieve the other files, various settings may be configured using the selected elements. For example, the settings may be configured such that the data manager 103 selects files that include all of the selected elements, or at least one of the selected elements. As another example, the settings may be configured to select the files that do not include the selected elements associated. The settings for these criteria may be customized according to any combination or in any logical expression with the selected elements.

The metadata may be contained within the file and/or may exist separately from the file. If it is determined that the file's metadata is separate from the file, the metadata may be obtained from a source containing the metadata. The metadata associated with the file have elements that contain information regarding the file. The elements may be segments of the metadata, wherein each segment represents different type of information about the file. The information about the file may include technical properties as well as properties of contents of the file and any other information. The technical properties of the file may include properties obtained from a device used to create the file, such as the type of means to create the file (e.g., camera, video camera, software applications, etc.), the creator of the file, the time and date of creation, the location, zoom settings, other image quality settings, header information. For example, if the file is an image file, then the metadata may include elements having information about a camera used to capture the image file, the time and the location of the image capture, creator of the image, image quality setting, and etc. The properties of contents of the file may include keywords describing the type of the content in the file (e.g., portrait photo, group photo, cat, rat, animals, etc.) as well as designated words. The designated words may include names of people, location and etc in a picture file, and descriptive keywords describing, for example, specific events (e.g., birthday) or circumstances (e.g., cold winter) shown in the file. Thus, the designated words may be defined by a user and/or manually entered into the metadata by the user. By way of an example, an image file with a family portrait and a pet cat may have designated words for names of the family members in the image file as well as the words such as "family" and "cat" as a type of the content in the image file, and these designated words are contained within the metadata as elements.

In one embodiment, the data manager 103 may present the elements of the metadata of the presented file at the UE 101. These elements may be selected by an input. For example, the elements may be presented at the UE 101 as a list of elements that can be selected via the input. In another example, an area of the presented file that displays an element may be selected to select the element of the metadata, thereby selecting the other files based, at least in part, on the selected element. In one example, the data manager 103 may list the elements of the metadata and display the list at the UE 101 such that the elements may be selected. In another example, the data manager may display the elements via the representations of the elements superimposed on the rendering based on the association between the elements and the areas of the presented file. The representations may be graphical icons, keywords or shapes that correspond to the respective elements of the metadata, and may be located in the areas that correspond to the respective elements. For example, in an image file of a cat, the keyword "cat" as a representation of the element "cat" may be presented superimposed on the area where the cat is located in the image if that area is associated with the element "cat." In addition, only predetermined elements may be shown on the presented file, without showing other elements. In one example, a user may determine what elements are to be shown as representations on the presented file. The data manager may be capable of learning to automatically suggest or select elements to be displayed based on the user's past behaviors. Further, the elements may be shown depending on the situations or any other context information. For example, the type of elements to be displayed with the presented file when the UE 101 indicates that the user is in a meeting may be different from the type of elements to be displayed when the UE 101 indicates that the user is on vacation. Further, in one embodiment, the representations may be displayed on the presented file only when trigger actions with respect to the presented file are applied. The trigger actions may include touch inputs, gestures, or combination thereof, for the input that is by touch, as well as pressing a button. For example, the representations may be displayed only when the touch screen displaying the file is touched or buttons are pressed at the UE 101. Further, the data manager 103 may place the elements in hierarchy such that only representations for elements in high hierarchy may be displayed on the presented file, while hiding subsets of such elements. If the representation of the element displayed on the presented file is selected, the subsets of the element may also become visible.

In another example, the data manager 103 may identify figures and/or objects in the selected areas, and then the selection of the other files is further based on this identification. For example, the data manager 103 may identify an object such as a "cat" in a selected area of an image file. Then, the data manager 103 may select the other files based on the object "cat." This object may be associated with an element.

For example, the object "cat" may be associated with the element with the keyword "cat." In another example, a user may select an area in the presented file, with a selection box, for example, and the data manager 103 may recognize the objects and/or the elements specific to the area within the selection box, and the association may be determined based on the objects and/or the elements and this area. Then, the other files may be selected based on these objects and/or elements and the area in the presented file.

Additionally, as previously discussed, the selection of the elements or the areas of the presented file may be made by touching the elements or the areas. In one embodiment, an input may be entered to define a sequence of the selected elements. Then, the other files are selected and/or presented based on the sequence. For example, a metadata element with a keyword "cat" may be defined as earlier in sequence than another metadata element with a keyword "rat". Then, the files selected based on the keyword "cat" are presented first, and then the files selected based on the keyword "rat" are presented. The sequence may also defined by the sequence of the touch. For example, if the user input selects the element with the keyword "cat," and then selects the element with a keyword "rat," then the sequence is determined based on this order. In another example, a duration or a strength of the touch pressure may define the sequence. Further, the presentation of the other files may depend on the touch input on the touch screen of the UE displaying the presented file. The data manager 103 may determine respective touch pressure information for the selected areas. The touch pressure strength as well as the duration of the touch pressure may be considered in presenting the other files. For example, the stronger the touch pressure is and/or the longer the duration of the touch pressure is, the number of the other files to be selected may be increased or decreased. Further, the data manager 103 may also determine degrees of matching of the other files to the elements, and present the other files based on the degrees of matching. The elements of metadata of the file being rendered may not completely match with the other files. Therefore, for example, the files with the best matches with the selected elements may be presented before the files with little matches. As another example, the files having all of the selected elements may be presented before the files having only one of the selected elements.

Further, if there are more suitable files that may be selected in the sources that are not defined by the settings of the UE 101, then the UE 101 may automatically suggest or select those files. Additional criteria may be applied for selecting the files (e.g., collaborative filtering or machine learning about the user's preferences or past behaviors).

When the selected files are presented, the elements that are selected for selecting the files may be hidden, since those selected the elements are already considered in the selecting of the files. However, the elements that are not selected may still be displayed in the selected files. Then, the user may select these elements that had not been selected previously, to collect a new set of files based on the newly selected elements. Further, in one example, these selected files may be acquired and then compiled as a slide show of the files. This slide show will have files that have similar properties according to the selected elements. This slide show may be shared with users of other devices, or may be uploaded to a web site, such as a social networking site.

This process is advantageous in that it provides a user of the UE 101 a convenient way to select, compile and present the other files based on the metadata information of a file. Thus, this process enhances the user experience in browsing other files based on the metadata information of the file rendered at the UE 101 as well as the information presented at the presented file. The data manager 103 is a means for achieving this advantage.

Figure 4A:
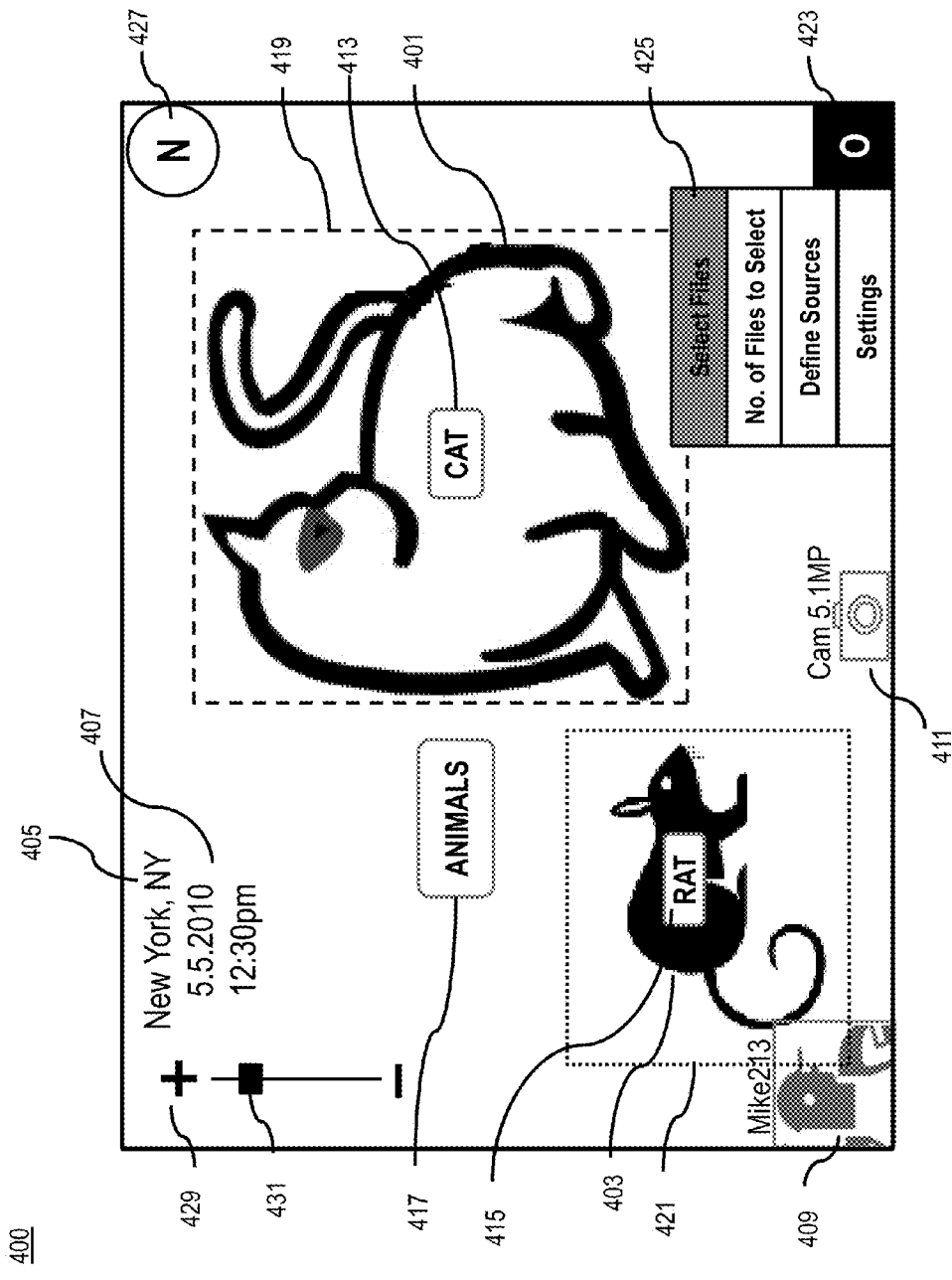
FIGS. 4A-4D are diagrams of user interfaces utilized in the processes of FIG. 3, according to various embodiments.

FIGS. 4A-4D are diagrams of user interfaces utilized in the processes of FIG. 3, according to various embodiments. FIG. 4A shows a user interface 400 that displays a file that presents an image file of a cat 401 and a rat 403 as well as information regarding elements of the metadata of the file. This user interface 400 also displays several representations of elements of metadata superimposed over the rendering of a presented image file. The representations in this example are elements for technical properties such as representations for the location of creation 405, the date and the time of creation 407, which shows that this image file is created in New York, N.Y. at 12:30 pm on May 5, 2010. The representation for the creator of the file 409 is shown as an avatar image and a user id "Mike213" representing the creator of the file. Further, the representation for the means of creation 411 shows a picture of a camera, and indicates that this image file is captured with a 5.1 megapixel camera. Further, the properties of the content of the file are also displayed as representations of the metadata. In this example, in the area of the presented file that displays the cat 401, the representation "CAT" 413 is superimposed. Similarly, in the area of the rendering that displays the rat 403, the representation "RAT" 415 is superimposed. Further, the user interface also shows the representation "ANIMALS" 417, since this image file shows two animals. These representations of the metadata may be selected such that the data manager 103 may select other files based on the selection of the representation. For example, if the user touches the area for the representation of the location of creation 405 to select the representation 405, then selection of the other files may be based on the location "New York, N.Y."

Further, because elements of metadata may be associated with respective areas of the rendering, certain areas may be selected to select their respective elements of the metadata. Thus, an area selector such as the first box selector 419 and the second box selector 421 may be used to select an area, which will result in selection of an element of the metadata associated with the selected area. In this example, the area with the picture of the rat 403 may be associated with the element of the metadata that includes the keyword "rat." Thus, by using the second box selector 421 to select the area with the picture of the rat 403, the element of the metadata "rat" may be recognized. Then, the other files may be selected based on this selection of the element "rat." Further, in this example, the first box selector 419 is in a normal dotted line, to represent that the first box selector 419 has not selected the area, whereas the second box selector 421 is in a fine dotted line to represent that the second box selector 421 has selected the area. Therefore, if the other files are selected based on the area selector, then the files will be selected based on the "rat" because the second box selector 421 has selected the area with the picture of the rat 403, but the first box selector 419 has not selected any area. The area selector including the first box selector 419 and the second box selector 421 may also be movable and customizable in the rendering. For example, the user may touch the screen to change the size or the shape of the area selector.

The user interface 400 also includes an option button 423, which, upon selection of the option button 423, enables display of selectable options 425. The selectable options 425 may include "Select Files" option to select the other files based on the selected representations or the selected areas, "No. of Files to Select" option to define the number of the other files to be selected, "Define Sources" option to define the sources from which the other files are selected, and "Settings" option to customize various settings. The user interface 400 also includes a sequence button 427 to number the representations or the areas on the rendering, such that the numbers represent the sequence on which the selection or the presentation of the other files are based. Further, the user interface 400 may also include a hierarchy selector 429 with a scroll bar 431 to enable scroll along various hierarchy levels for the elements of the metadata. For example, if the scroll bar 431 is scrolled closer to the plus sign, then the representations for the elements show the elements of the metadata in a higher hierarchy. As the scroll bar 431 is scrolled closer to the minus sign, the representations show the elements of the metadata in a lower hierarchy, and thus may show more details or subset information for the corresponding elements. This example is illustrated more in detail in FIG. 4B.

Figure 4B:
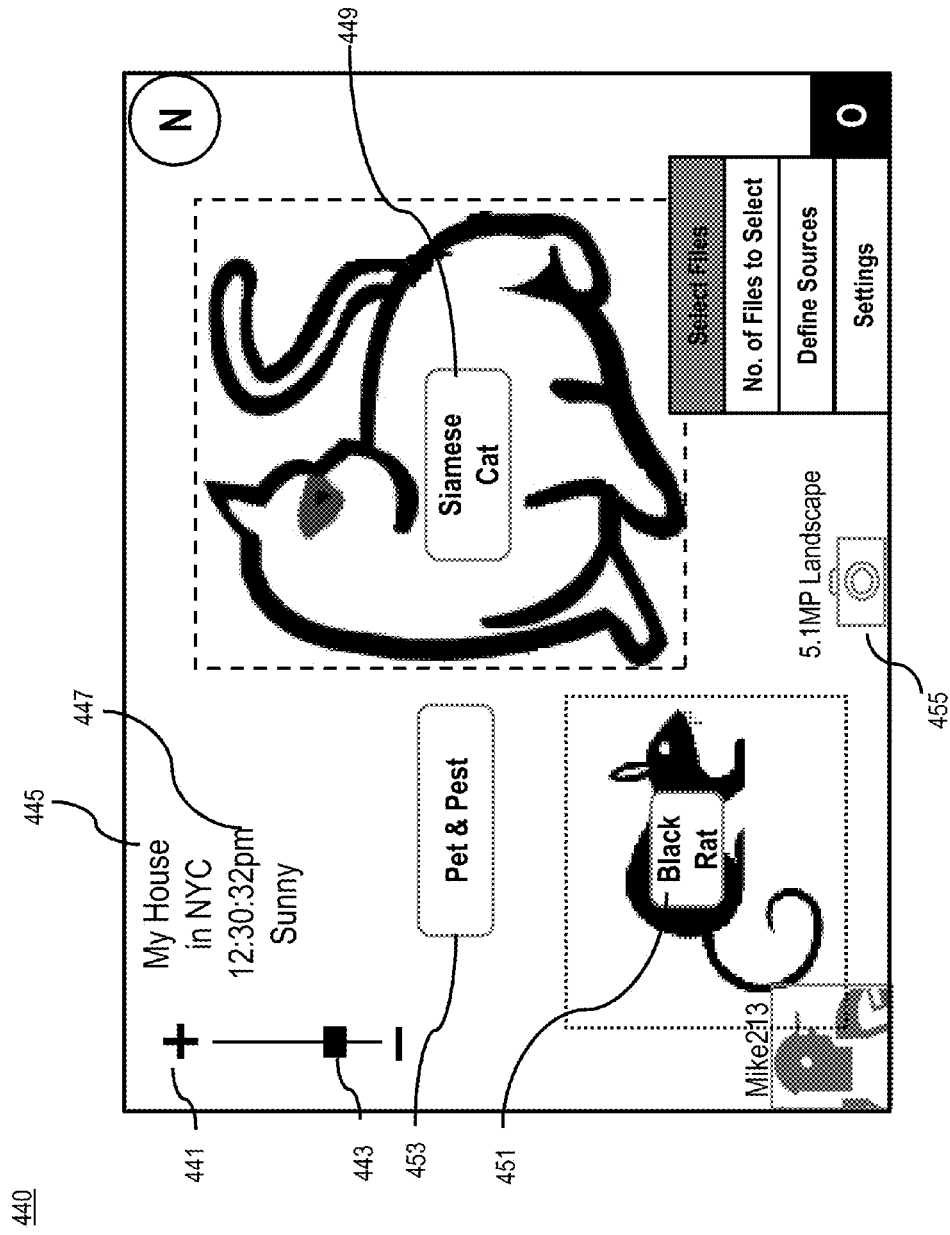

FIG. 4B shows a user interface 440 that is similar to the user interface 400, but shows representations of the elements in a lower hierarchy than the representations in the user interface 400. The hierarchy selector 441 in FIG. 4B shows that the scroll bar 443 is located closer to the minus sign than the scroll bar 431 in FIG. 4A. Thus, the representations in the user interface 440 show the elements of the metadata in a lower hierarchy than what is shown in the user interface 400. The representation for the location of the creation 445 shows that the file was created in "My House in NYC", which is subset information of "New York, N.Y." shown in the representation 405 in FIG. 4A. Similarly, and representation for the time of creation 447 shows that the file was created at 12:30 pm and 32 seconds when it was sunny, which is subset information of the information showing the time 12:30 pm on May 5, 2010 shown in the representation 407 in FIG. 4A. Further, the representations "Siamese Cat" 449 and "Black Rat" 451, are subsets of the representations "CAT" 413 and "RAT" 415 in FIG. 4B, and thus the representations "Siamese Cat" 449 and "Black Rat" 451 show more detailed information about the cat and the rat. Similarly, the representation "Pet & Pest" 453 shows subset information of the representation "ANIMALS" 417 in FIG. 4A. In addition, the representation for the means of creation 455 shows that the file was captured in a 5.1 megapixels landscape mode, which shows additional information to the representation 411 in FIG. 4A.

Figure 4C:
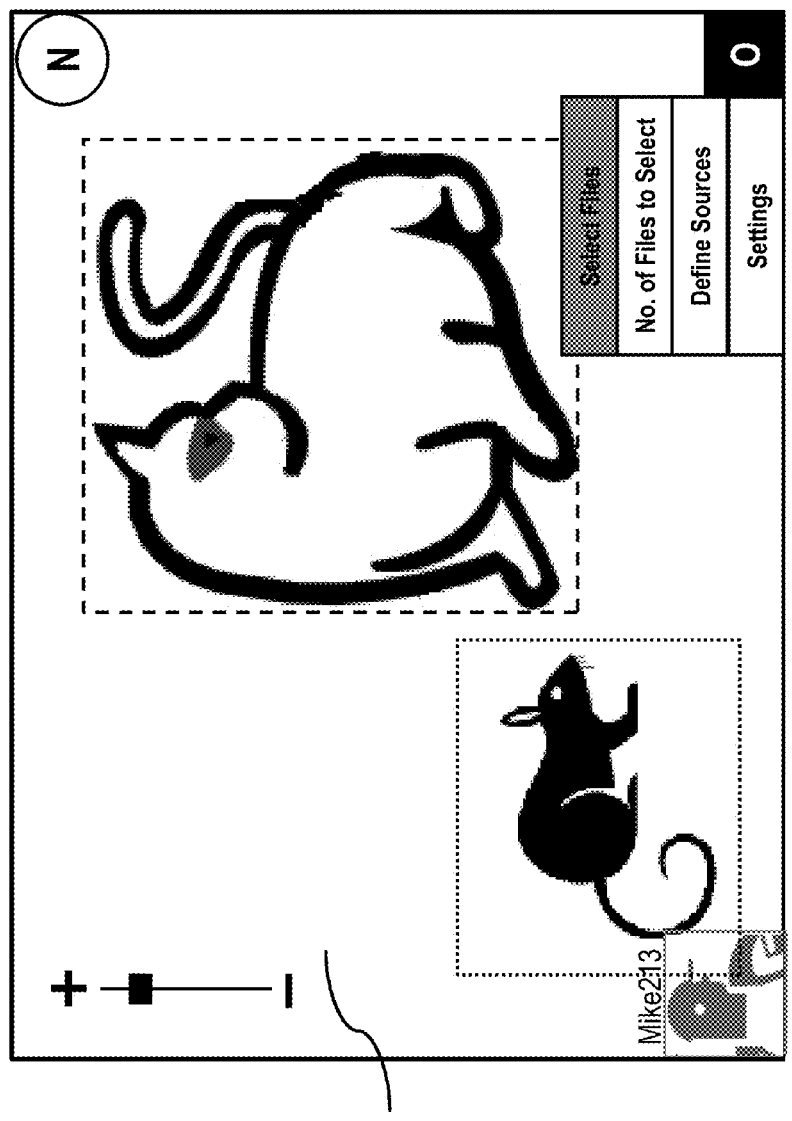

FIG. 4C shows a user interface 460 that does not show the representations of the elements of the metadata. The user may hide the representations of the elements of the file by configuring a setting or pressing a button. For a touch screen interface, the user may also hide or show the representations by double-tapping on a blank screen twice. For example, if the user taps on a blank screen 461 twice, then the user interface may show the representations, thus displaying a user interface similar to FIGS. 4A and 4B. Further, if the user taps on a screen showing a user interface with the representations, which is similar to FIG. 4A or 4B, then the representations may be hidden to show a user interface similar to the user interface 460.

Figure 4D:
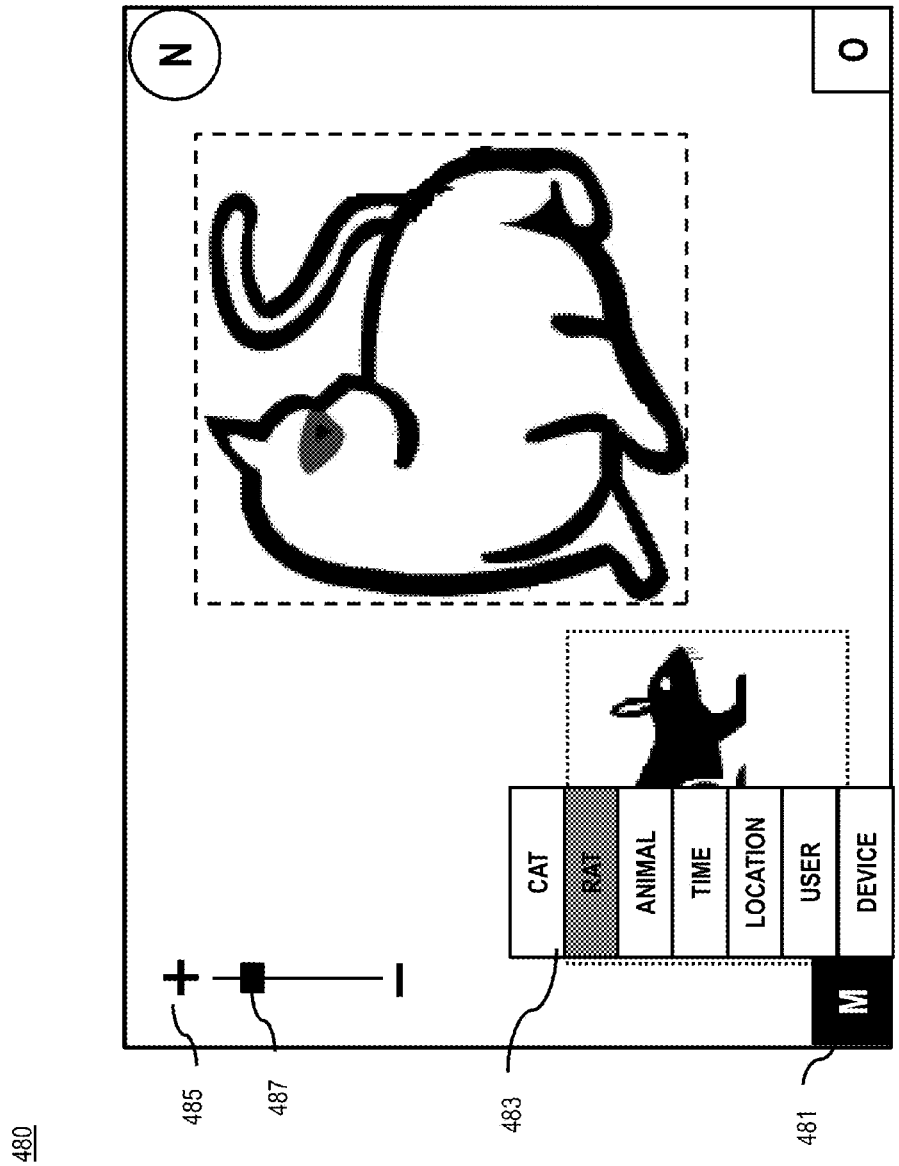

FIG. 4D shows a user interface 480 for another embodiment that has an option to list the elements of the metadata that can be selected. The metadata button 481 may be selected to open a list of metadata elements 483. The list 483 includes the elements of metadata corresponding to the hierarchy set by the hierarchy option 485 and the scroll bar 487. The list 483 in FIG. 4D shows elements including cat, rat, animal, time (time of creation of the file), location (location of creation of the file), user (user who created the file) and device (means for creating the file). This list 483 would change if the scroll bar 487 was moved to change the hierarchy of the elements to be shown.

Figure 5A:
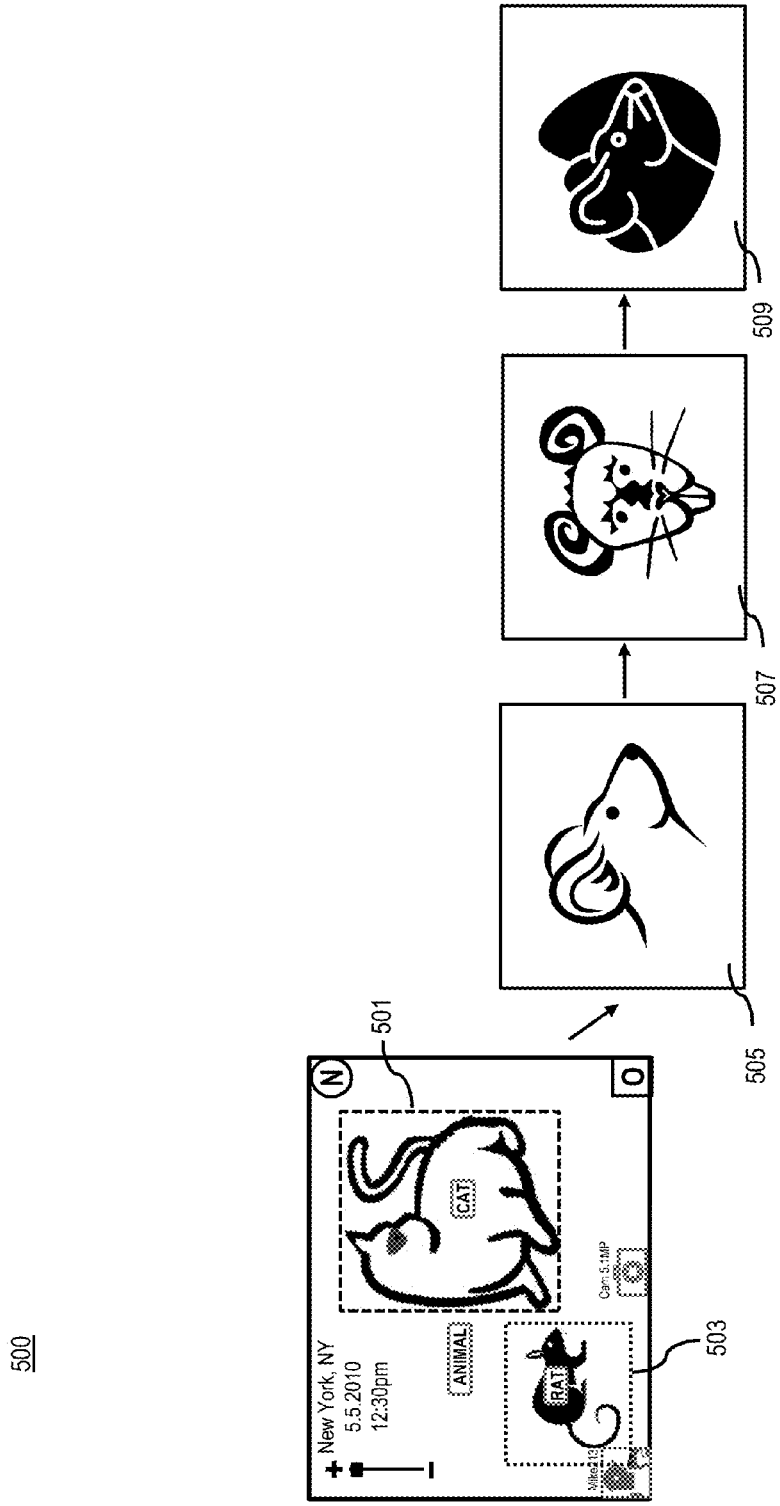

FIGS. 5A-5D are diagrams utilized in the processes of FIG. 3, when selecting the files, according to various embodiments. FIG. 5A shows an example in a diagram 500 of selecting the other files based on the selection of one area on the rendering/representation. In FIG. 5A, the first box selector 501 has not selected the area with the cat, as shown by the normal dotted line, and the second box selector 503 has selected the area with the rat, as shown by the fine dotted line. Thus, the other files including the keyword "rat" as a metadata element have been selected. As shown, the selected other files 505, 507 and 509 show pictures of rat, since the selection of the other files were based on the keyword "rat."

FIG. 5B shows another example in a diagram 530 of selecting the other files based on the selection of another area on the rendering/representation. In FIG. 5B, the first box selector 531 has selected the area with the cat, as shown by the fine dotted line, whereas the second box selector 533 has not selected the area with the rat, as shown by the normal dotted line. Therefore, the other files including the keyword "cat" as a metadata element have been selected. The selected other files 535, 537 and 539 show pictures including cats. The file 539 is selected later than the other two files 535 and 537 because the file 539 has a picture of both a dog and a cat (e.g., having keywords "dog" and "cat" as metadata elements), and thus is not as relevant as the files 535 and 537 that have a picture of only a cat. Further, an area may be selected using a third box selector 541 from the rendering of the file 539 to select additional files based on the area selected using the third box selector 541. In this example, the area selected using the third box selector 541 shows a dog, and thus the selected file 543 has a picture of a dog.

FIG. 5C shows an example in a diagram 550 of selecting other files based on the selection of two areas/representations. In FIG. 5C, the first box selector 551 has selected the area with the cat, as shown by the fine dotted line, and the second box selector 553 has also selected the area with the rat, also as shown by the fine dotted line. In this example, because the metadata element keywords corresponding to the selected area are "cat" and "rat," the selection of the other files is based on both of the keywords "cat" and "rat." Therefore, the other files 555 and 557 that are selected based on "cat" and "rat" have pictures of both "cat" and "rat."

Figure 5D:
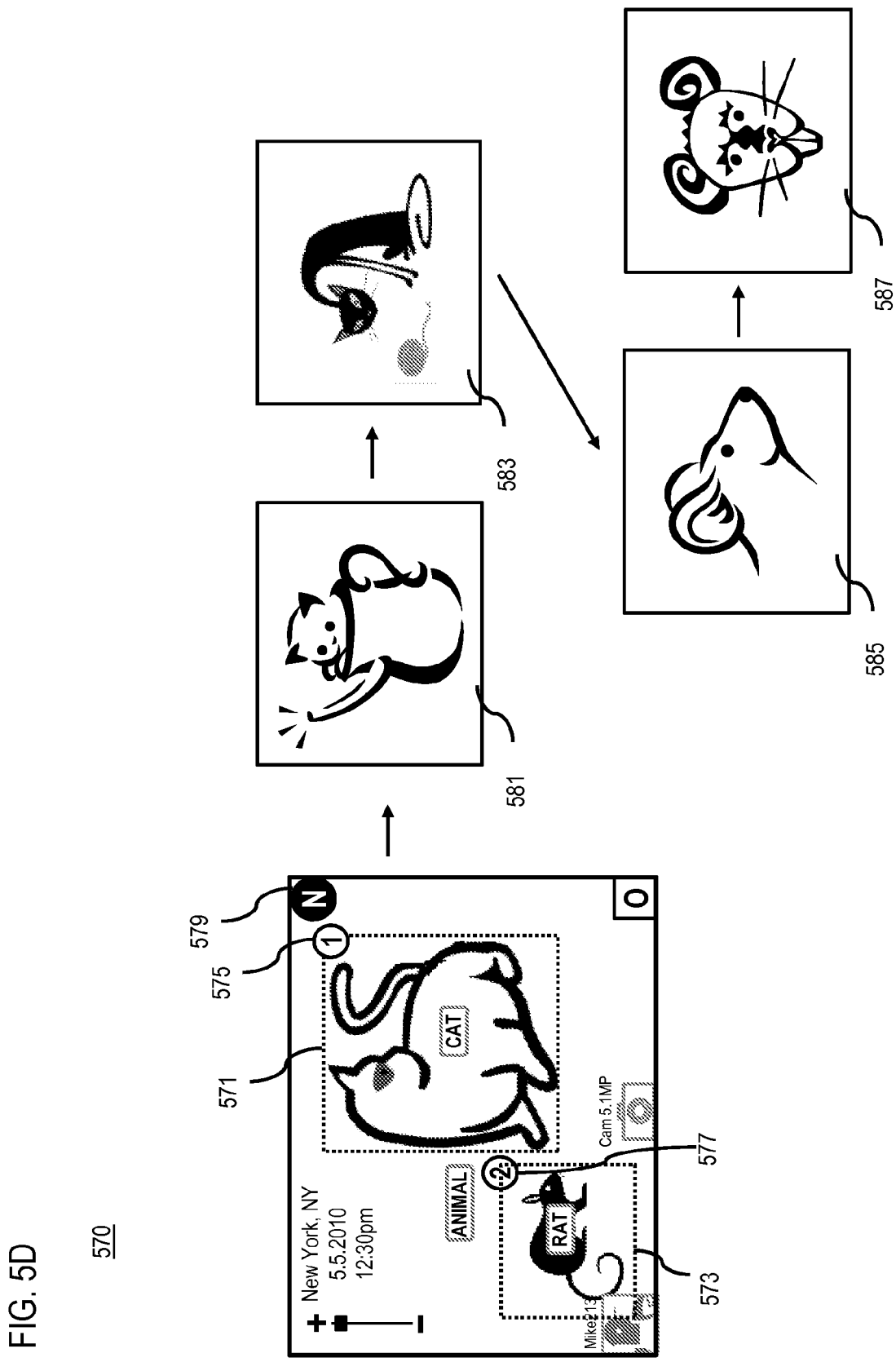

FIG. 5D shows another example in a diagram 550 of selecting other files based on the selection of two areas/representations. In FIG. 5D, both the first box selector 571 and the second box selector 573 are selected, as shown by the fine dotted lines. Further, the first box selector 571 is designated with a #1 mark 575 in sequence and the second box selector 573 is designated with a #2 mark 577 in sequence. These sequence marks are activated by selecting the sequence button 579. Because "cat" is designated as #1 in sequence and "rat" is designated as #2 in sequence, the data manager 103 selects the other files based on "cat" first and then "rat." Therefore, in this example, the first two files 581 and 583 that were selected contain pictures of cats, and the last two files 585 and 587 contain pictures of rats.

Figure 6A:
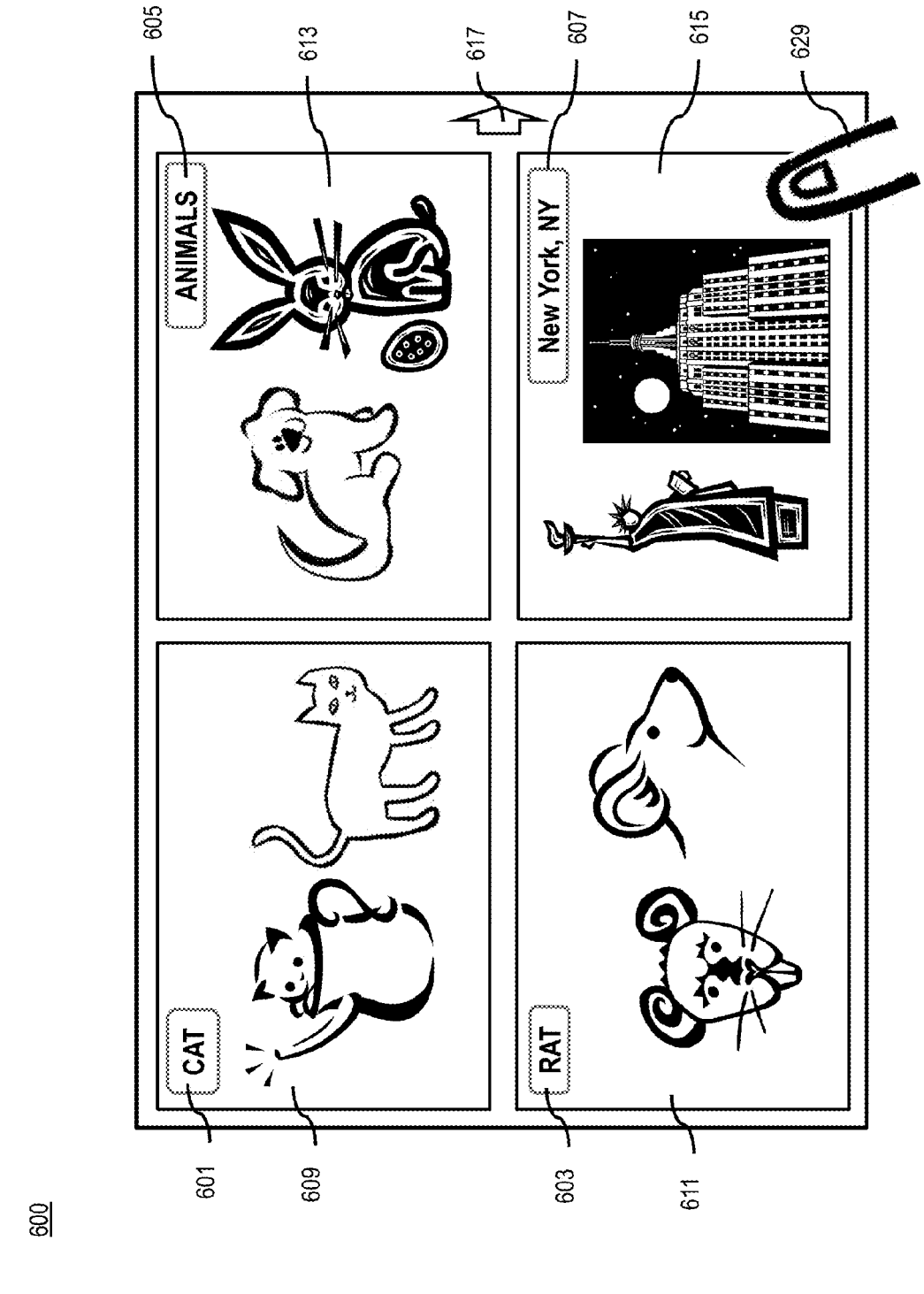
FIGS. 6A-6C are diagrams utilized in the processes of FIG. 3, when selecting the files, according to another embodiment.
Figure 6B:
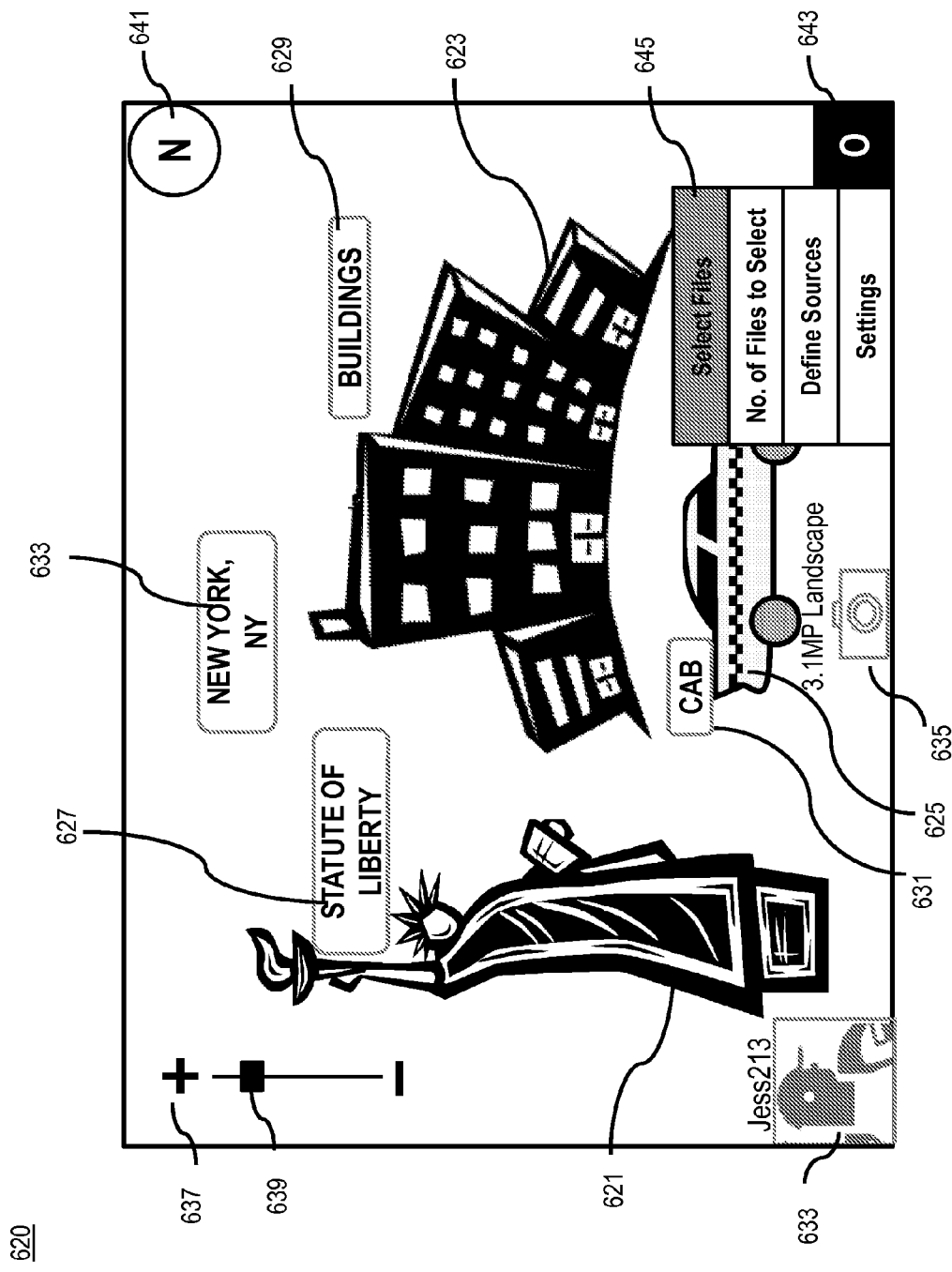
Figure 6C:
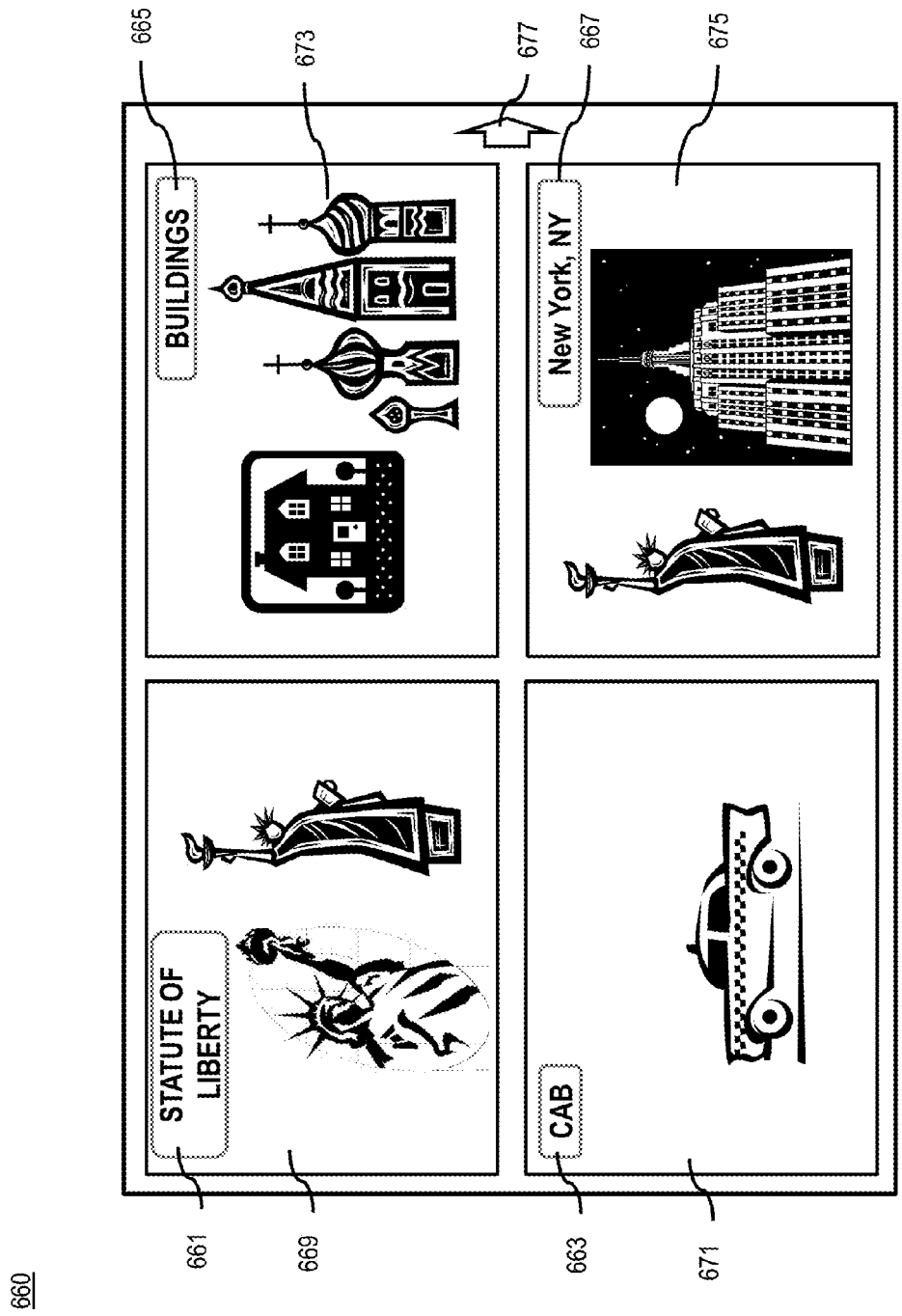

FIGS. 6A-6C are diagrams utilized in the processes of FIG. 3, when selecting the files, according to another embodiment. FIGS. 6A-6C are based on the example shown as a user interface 400 in FIG. 4A. FIG. 6A shows available slide shows of the files selected based on the elements of the metadata, wherein these slide shows are displayed in parallel. In this example, because multiple elements are selected, multiple slide shows are displayed in one screen. In FIG. 6A, the user interface 600 displays four slide shows of image files selected based on four respective elements, "cat" 601, "rat" 603, "animals" 605 and "New York, N.Y." 605. These four elements 601, 603, 605 and 607 are the elements displayed in the user interface 400 in FIG. 4A. The cat slide show 609 and the rat slide show 611 show slide shows of image files related with a cat and a rat, respectively. The animal slide show 613 shows a slide show of image files related with all types of animals. The New York slide show 615 shows a slide show of image files that are related with New York, N.Y. The arrow button 617 may be selected to go to the next screen that shows another sets of available slide shows of the files selected based on different elements of the metadata than the elements displayed in the user interface 600. A finger 629 may be used to tap one of the slide shows to select the tapped slide show and display it in a full screen.

FIG. 6B shows an example user interface 620 for a slide show for the element "New York, N.Y." If the finger 629 in FIG. 6A taps the New York slide show 615, then the user interface 620 in FIG. 6B is displayed. The image file presented in the user interface 620 is one of the image files in the slide show. This image file shows an image related to New York, N.Y., and thus includes pictures of the statue of liberty 621, buildings 623 and a cab 625. The user interface 620 also displays representations of the elements such as the statue of liberty element 627, the buildings element 629, the cab element 631 and the New York element. Further, the user interface 620 displays a representation for the creator of the file 633 shown as an avatar image and a user id "Jess213," and the representation for the means of creation 635 indicating that this image file is captured with a 3.1 megapixel camera. Further, the user interface 620 may also include a hierarchy selector 637 with a scroll bar 639 having the same features of the hierarchy selector 429 and a scroll bar 431 of FIG. 4A. The user interface 620 may also have a sequence button 641 having the same feature as the sequence button 427 of FIG. 4A. The option button 643 and the selectable options 645 also have the same features as the option button 423 and the selectable option 425 of FIG. 4A.

FIG. 6C shows an example user interface 660 for displaying available slide shows of the files selected based on the elements of the metadata, wherein these slide shows are displayed in parallel. If the "Select Files" option is selected from the selectable option 645 in the user interface 620, then the user interface 660 is displayed to show slide shows of selected image files. In FIG. 6C, the user interface 660 displays four slide shows of image files selected based on the statue of liberty element 661, the cab element 663, the buildings element 665 and the New York element 667. These four elements 661, 663, 665 and 667 are the elements displayed in the user interface 620 in FIG. 6B. The statue of liberty slide show 669, the cab slide show 671, the buildings slide show 673, the New York slide show 675 show slide shows of image files related with the statue of liberty, a cab, buildings, New York, N.Y., respectively. The arrow button 677 may be selected to go to the next screen that shows another sets of available slide shows of the files selected based on different elements of the metadata than the elements displayed in the user interface 660. Further, one of these slide shows may be selected to be displayed in a full screen.

The processes described herein for browsing content files may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to select additional files according to metadata of a file as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of selecting additional files according to metadata of a file.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to selecting additional files according to metadata of a file. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for selecting additional files according to metadata of a file. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for selecting additional files according to metadata of a file, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for selecting additional files according to metadata of a file.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
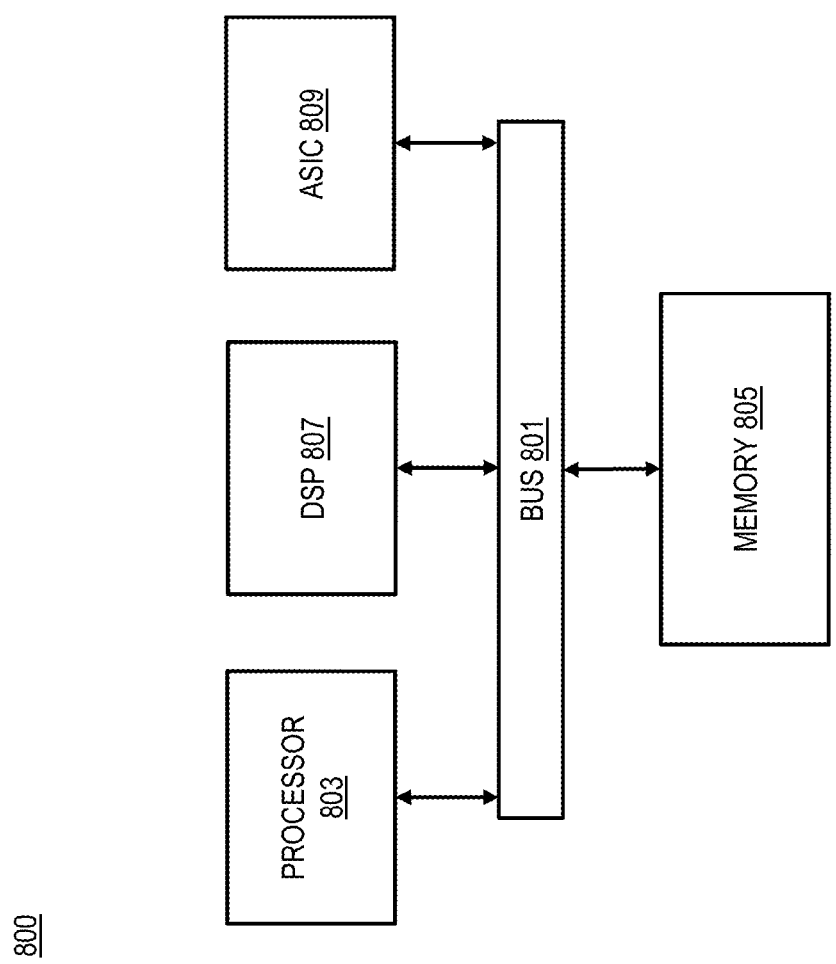
FIG. 8 is a diagram of a chip set that can be used to implement an embodiment of the invention.

FIG. 8 illustrates a chip set or chip 800 upon which an embodiment of the invention may be implemented. Chip set 800 is programmed to select additional files according to metadata of a file as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of selecting additional files according to metadata of a file.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to select additional files according to metadata of a file. The memory 805 also stores the data associated with or generated by the execution of the inventive steps.

Figure 9:
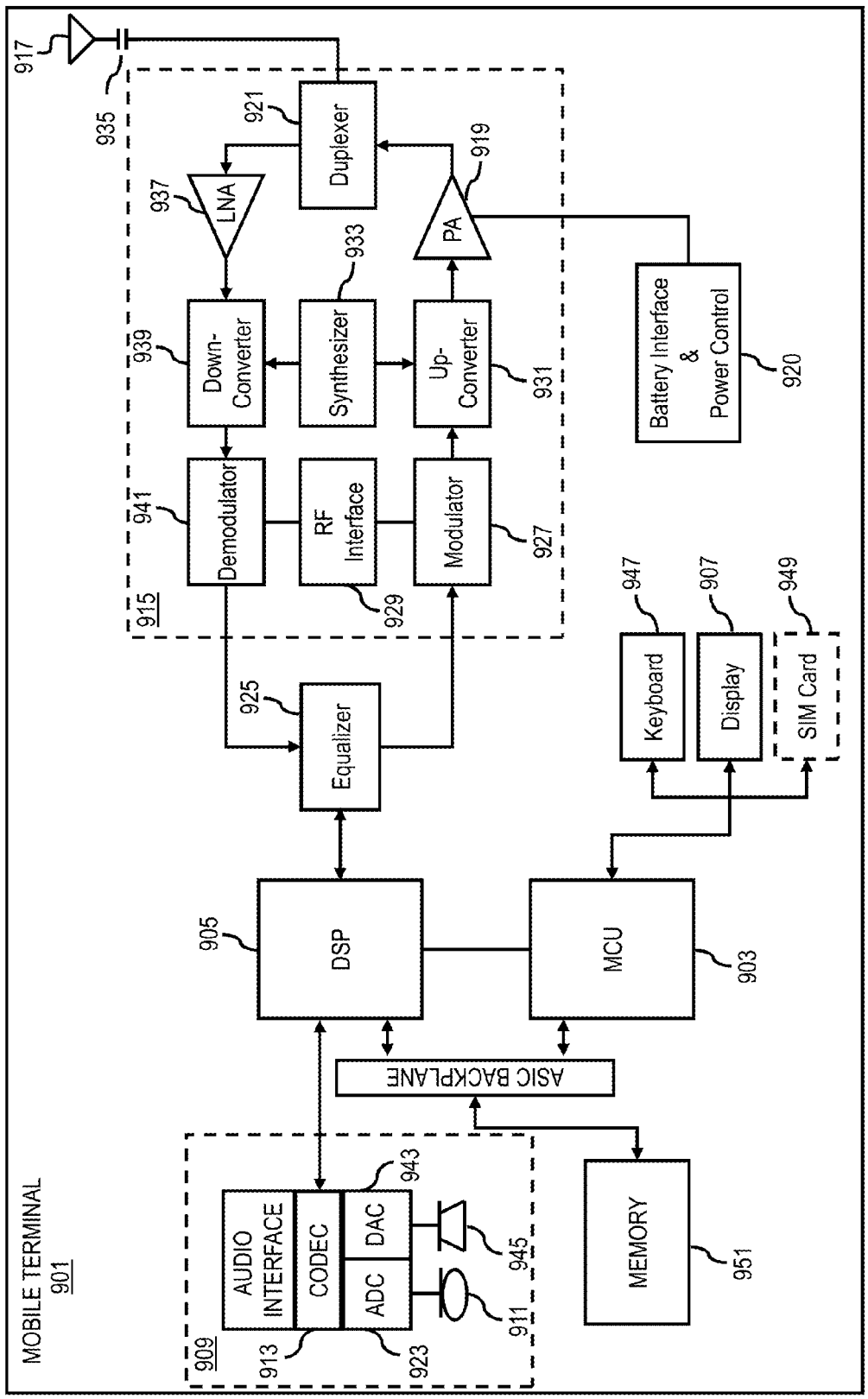
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of selecting additional files according to metadata of a file. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of selecting additional files according to metadata of a file. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to select additional files according to metadata of a file. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to present a file at a user device;
   receiving at the user device an input selecting by touching one or more areas in the presentation of the file;
   in response to the input, identifying by the user device one or more non-selectable graphical figures, one or more non-selectable graphical objects, or a combination thereof that are visually presented in the selected one or more areas and correspond to one or more elements of metadata associated with the file;
   determining by the user device to select one or more other files based, at least in part, on the identification;
   determining respective touch pressure information for each of the selected one or more areas; and
   determining to present a number of the one or more other files that correspond to one of the figures and objects, wherein the number of the corresponding files is proportional to one or more attributes of the respective touch pressure information.

2. A method of claim 1, further comprising:
   in response to the identification, determining to present one or more of the metadata in text superimposed on the selected one or more areas; and
   receiving at the user device another input selecting one or more of the presented metadata.

3. A method of claim 2, wherein the determining to select the one or more other files is further based, at least in part, on the selected one or more of the presented metadata.

4. A method of claim 2, wherein the metadata includes an author of the file, a creation time of the file, a creation location of the file, one or more zoom settings for creating the file, one or more image settings for creating the file, or a combination thereof.

5. A method of claim 1, wherein the input is by touch, the method further comprising:
   determining one or more touch inputs, gestures, or a combination thereof with respect to the file,
   determining to present one or more representations of at least a portion of the set of one or more elements based, at least in part, on the one or more touch inputs, gestures, or a combination thereof.

6. A method of claim 1, wherein one of the selected one or more elements corresponds to a sequence of the one or more other files, the method further comprising:
   determining to present the sequence of the one or more other files as a slideshow.

7. A method of claim 6, wherein the sequence of the one or more other files is presented one after another as the slideshow.

8. A method of claim 1, further comprising:
   determining respective degrees of matching of the one or more other files to the one or more elements; and
   determining to present the one or more other files based, at least in part, on the respective degrees of matching.

9. A method of claim 1, further comprising:
   receiving preference information for sources of the selected one or more other files,
   wherein the selection of one or more other files from the sources is based on the preference information.

10. A method of claim 1, wherein the one or more attributes of the respective touch pressure information includes a strength of the touch pressure, a duration of the touch pressure, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    determine to present a file at a user device;
    receive an input selecting by touching one or more areas in the presentation of the file;
    in response to the input, identify one or more non-selectable graphical figures, one or more non-selectable graphical objects, or a combination thereof that are visually presented in the selected one or more areas and correspond to one or more elements of metadata associated with the file;
    determine to select one or more other files based, at least in part, on the identification;
    determine respective touch pressure information for each of the selected one or more areas; and
    determine to present a number of the one or more other files that correspond to one of the figures and objects, wherein the number of the corresponding files is proportional to one or more attributes of the respective touch pressure information.

12. An apparatus of claim 11, wherein the apparatus is further caused to:
    in response to the identification, determine to present one or more of the metadata in text superimposed on the selected one or more areas; and
    receive another input selecting one or more of the presented metadata.

13. An apparatus of claim 12, wherein the determining to select the one or more other files is further based, at least in part, on the selected one or more of the presented metadata.

14. An apparatus of claim 11, wherein the input is by touch, the apparatus being further caused to:
    determine one or more touch inputs, gestures, or a combination thereof with respect to the file,
    determine to present the one or more representations of at least a portion of the set of one or more elements based, at least in part, on the one or more touch inputs, gestures, or a combination thereof.

15. An apparatus of claim 11, wherein the apparatus is further caused to:
    determine respective degrees of matching of the one or more other files to the set of the one or more elements; and
    determine to present the one or more other files based, at least in part, on the respective degrees of matching.

16. An apparatus of claim 11, wherein the apparatus is further caused to:
    receive preference information for sources of the selected one or more other files,
    wherein the selection of one or more other files from the sources is based on the preference information.

17. A non-transitory computer-readable storage medium carrying one or more sequences of one or more instructions which, when executed by one or more processors, cause an apparatus to at least perform the following steps:
    determining to present a file at a user device;
    receiving an input selecting by touching one or more areas in the presentation of the file;
    in response to the input, identifying one or more non-selectable graphical figures, one or more non-selectable graphical objects, or a combination thereof that are visually presented in the selected one or more areas and correspond to one or more elements of metadata associated with the file;

determining to select one or more other files based, at least in part, on the identification;

determining respective touch pressure information for each of the selected one or more areas; and determining to present a number of the one or more other files that correspond to one of the figures and objects, wherein the number of the corresponding files is proportional to one or more attributes of the respective touch pressure information.

18. A non-transitory computer-readable storage medium of claim 17, wherein the apparatus is caused to further perform:

in response to the identification, determining to present one or more of the metadata in text superimposed on the selected one or more areas; and receiving at the user device an input selecting one or more of the presented metadata.

19. A non-transitory computer-readable storage medium of claim 17, wherein the determining to select the one or more other files is further based, at least in part, on the selected one or more of the presented metadata.

* * * * *